United States Patent [19]

Ghosh

[11] Patent Number: 5,322,740
[45] Date of Patent: Jun. 21, 1994

[54] SOLID STATE JOINT BETWEEN ALUMINUM ALLOYS AND/OR MAGNESIUM ALLOYS, AND A METHOD OF MAKING SAME

[75] Inventor: Amit K. Ghosh, Thousand Oaks, Calif.

[73] Assignee: Rockwell International Corporation, Seal Beach, Calif.

[21] Appl. No.: 734,428

[22] Filed: May 16, 1985

[51] Int. Cl.⁵ .............................................. B32B 15/01
[52] U.S. Cl. .................................... 428/649; 228/195; 228/263.17; 228/262.5
[58] Field of Search .............. 428/608, 609, 651, 654, 428/649; 228/157, 173.2, 173.4, 155, 156, 195, 263.17

[56] References Cited

U.S. PATENT DOCUMENTS

| | | | |
|---|---|---|---|
| 3,214,564 | 10/1965 | Katzer et al. | 428/608 |
| 3,406,446 | 10/1968 | Muldovan | 428/608 |
| 3,538,593 | 11/1970 | King, Jr. et al. | 228/173.2 |
| 3,920,175 | 11/1975 | Hamilton et al. | 222/173.2 |
| 3,927,817 | 12/1975 | Hamilton et al. | 222/157 |

Primary Examiner—Donald P. Walsh
Assistant Examiner—John N. Greaves
Attorney, Agent, or Firm—John C. McFarren

[57] ABSTRACT

A solid state joint and a method of making a solid state joint between aluminum or magnesium alloys is provided. The joint consists of a diffusion bond with unmelted pieces of a fragmented foil dispersed along the diffusion bond. The joint is made by placing a friable foil between the parts being joined and pressing the parts together to crack the foil. The assembly is then heated and pressed together for a sufficient time, temperature, and pressure to cause the aluminum or magnesium alloy to flow into the cracks, across the foil, and then to diffusion bond together. The foil is made from a material which is harder than the alloy being joined and which will not melt at the bonding temperature.

21 Claims, 2 Drawing Sheets

Fig.3.
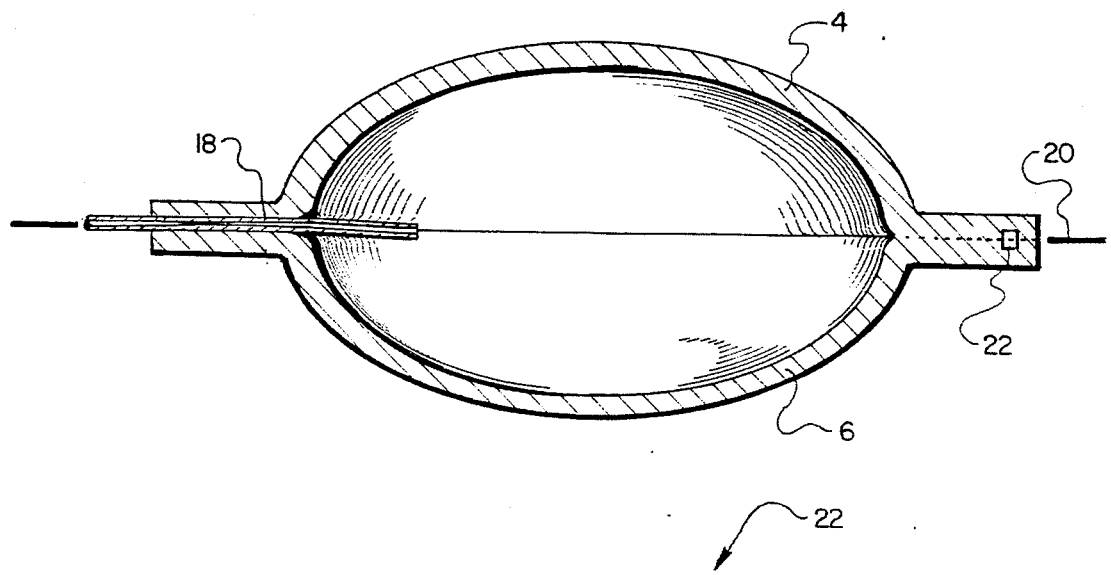
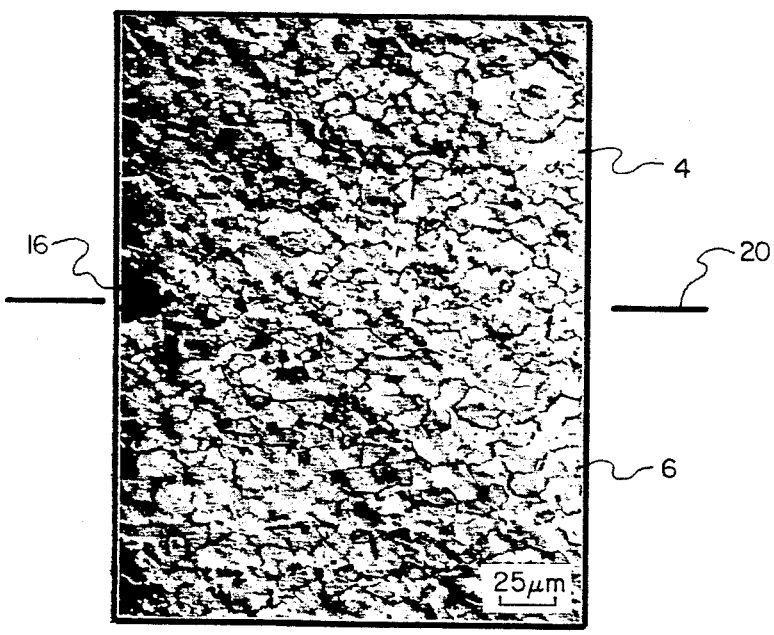
Fig.4.

SOLID STATE JOINT BETWEEN ALUMINUM ALLOYS AND/OR MAGNESIUM ALLOYS, AND A METHOD OF MAKING SAME

BACKGROUND OF THE INVENTION

This invention relates to the field of joining metals by solid state bonding (diffusion bonding) and particularly to joining aluminum alloys, magnesium alloys, or composites having these alloys as matrices.

Solid state bonding, or diffusion bonding, is the metallurgical joining of similar or dissimilar metals by applying heat and pressure for a time sufficient to cause commingling of atoms at the joint interface. The bonding is accomplished without any melting at a temperature which is at or above about one-half the absolute melting temperature of the metal being joined.

Structures have been produced successfully by diffusion bonding titanium alloys using methods as described in U.S. Pat. Nos. 3,920,175 and 3,927,817. Titanium is unique in that it can dissolve its own oxide at the diffusion bonding temperature. Thus, commingling of the metal atoms to form a diffusion bond can proceed without being blocked by the oxide which naturally forms on most metal surfaces. As illustrated in the above mentioned patents, diffusion bonding has been combined with superplastic forming to produce many high quality monolithic aerospace structures.

Unfortunately, the oxide which occurs on aluminum and magnesium alloys is not dissolved into the base metal at diffusion bonding temperatures. These alloys have a high affinity for oxygen and an oxide film is ever present on their surface. If the oxide film is broken under atmospheric conditions, a new oxide layer is formed almost immediately.

Several approaches have been tried to diffusion bond aluminum. In one approach, the oxide is completely removed and the oxide-free surface is kept in a vacuum to prevent reformation of the oxide during bonding. U.S. Pat. No. 4,483,478 describes such a method whereby "sputtering" is used to remove the oxide and a vacuum is maintained during bonding. However, an extremely good vacuum (less than $10^{-8}$ torr) is required to prevent oxide formation on aluminum within a short time. This level of vacuum is not easy to achieve and the need to physically manipulate workpieces inside a vacuum chamber increases the expense and limits the capability of the process.

In another prior art approach, thoroughly cleaned aluminum sheets are compressed (or rolled) together by about 60% strain (i.e., their surface area is increased 60% while in intimate contact). The broken oxide skin rolls into globules generating good metallic contact and a diffusion bond. Although some configurations can be made by this method, the large amount of deformation required is not suitable for many applications because the regions of desired bond location can shift considerably during joining.

Other attempts to bond aluminum use intermediate materials such as coatings or a layer of a bonding material between the parts. Frequently, the intermediate material itself is difficult to bond to the aluminum. If it has a low melting or softening temperature, the resulting bond will be suitable for subsequent superplastic forming which is done at an elevated temperature. Further, in high strength aluminum alloys having a composition close to their solid solubility limits, it is nearly impossible to diffuse the constituents of the intermediate layer back into the alloy itself. These approaches have not provided consistent high strength bonds.

SUMMARY OF THE INVENTION

It is an object of the invention to provide an improved method for solid-state bonding aluminum, magnesium, their alloys or composites having these alloys as matrix materials.

It is an object of the invention to provide a method for making monolithic trusscore or other structures by a combination of solid state bonding and superplastic forming of aluminum alloys.

It is an object of the invention to provide a solid state joint between aluminum, magnesium, or their alloys which has good mechanical properties at both room temperature and elevated temperature.

According to the invention, a thin, friable foil is placed in the joint location between aluminum or magnesium parts. The parts are then pressed together in the joint location to crack or fragment the thin friable foil. The assembly is then heated and pressed together for a sufficient time, temperature, and pressure to cause the fresh metallic material of both parts to flow into the cracks in the foil and into contact with each other. The extensive, but highly localized deformation of the alloy breaks up the surface oxide and provides a substantially oxide-free surface for diffusion bonding off the mating parts. If the foil material has a tendency to form a solid state solution with the alloy in the parts, the joint is strengthened further.

The deformation surfaces are highly confined and at least partly protected from oxidation during the deformation step. A vacuum or inert atmosphere may also be provided to protect the mating surfaces from oxidation.

The friable foil is made from a material which is harder than the aluminum or magnesium alloy being joined and which has a melting temperature higher than the diffusion bonding temperature. Consequently, the joint formed has no melted constituents but consists of unmelted fragments of the foil dispersed between the two parts along the solid state diffusion bond.

The friable foil can be made from metals such as silver, titanium, nickel, iron, or silicon (and their alloys), which are cold worked if necessary to make the foil harder than the aluminum or magnesium being bonded. In a preferred embodiment, a grid of deep grooves is formed in the foil to facilitate cracking and fragmentation of the foil.

These and other objects and features of the invention will be apparent from the following detailed description taken with reference to

BRIEF DESCRIPTION OF THE DRAWINGS

FIG. 3 is a cross section of a pillow structure made by solid state joining the edges and then superplastically expanding the unbonded center portion; and FIG. 4 is a photomicrograph of a section taken across the solid state joint of the pillow structure.

DESCRIPTION OF THE PREFERRED EMBODIMENT

This invention utilizes surface deformation to rupture the naturally occurring oxide on aluminum and create oxide-free surfaces for diffusion bonding. It is desirable to obtain as much surface deformation as possible to provide a large oxygen-free surface, while at the same time not greatly distorting the parts joined. These apparently contradictory objectives are accomplished by using a special friable foil interlayer to provide highly localized deformation (100% to 200%) at the surface of the parts with only minor overall deformation (for example, a 2% to 3% reduction of sheet thickness) of the parts being joined.

Figure 1:
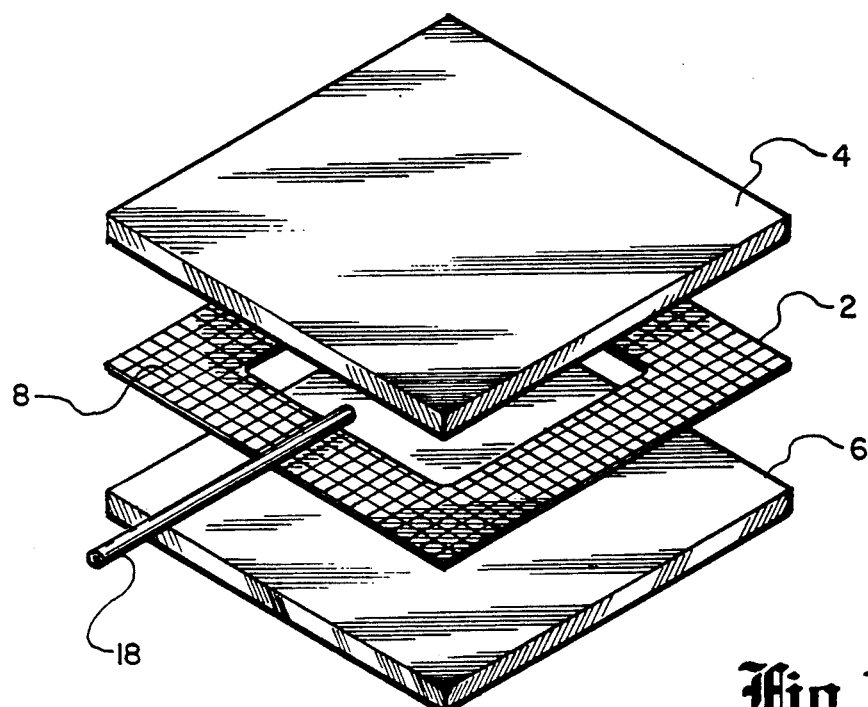
FIG. 1 is an expanded, perspective view of a layup for making a simple pillow structure.

FIG. 1 is an expanded assembly of parts used to fabricate a pillow structure and to illustrate the method of the invention. A friable foil 2 is placed between two superplastic aluminum alloy sheets 4, 6 in the area desired to form a joint. Foil 2 is made from a material which is harder than aluminum alloy sheets 4, 6 and which has a melting temperature that is higher than the diffusion bonding and superplastic forming temperature of the sheet. There should be no detrimental chemical or metallurgical reaction between the foil material and the material being bonded. However, a small amount of solid solubility between these materials can improve the bond strength, and would be considered a desirable attribute in selecting the foil material. In other situations, a small amount of reaction phase formation can also aid in improving bond strength. Additionally, the thermal expansion mismatch can affect the residual stresses in the bond, and thus the foil selection should be made to minimize this mismatch. Empirical bond experiments with different materials can be used to readily assess the bonding characteristics of different interlayer foils.

Figure 2:
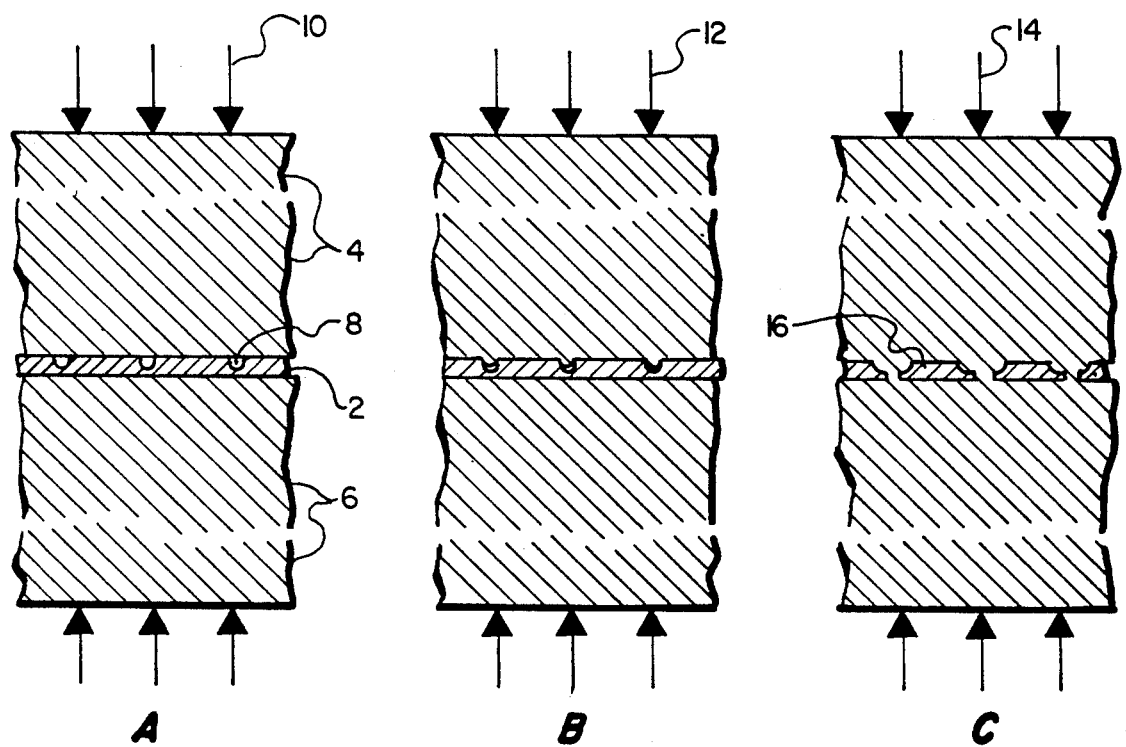
FIG. 2 shows three stages (A, B, and C) in the formation of a solid state bond.

A grid of deep grooves 8 has been formed in foil 2 to facilitate cracking of the foil. The grooves can be configured as necessary to provide a strong joint. FIG. 2 shows deep grooves 8 separated by plateaus. To provide better anchoring of foil 12 into the material being joined, the grooves can be elongated and separated by sharp peaks. Grooves can be provided on both sides of foil 2. Suitable grids can be formed in the foil by photo-etching techniques or by mechanical means such as rolling the foil with a stainless steel wire grid. The rolling method increases the cold work in the interleaf material and thereby increases its tendency to crack. Other methods of embrittling the foil may also be used. Grids of 50 lines per inch and 0.002 inch deep have been made in 0.003 inch thick foil. Grids of 100 lines per inch also appear suitable for practicing the invention.

FIG. 2 shows cross sections of the joint area at various steps in the method. As shown in FIG. 2A, load 10 is applied to the pack (4, 2, 6) in order to generate a state of in-plane biaxial tensile stress to cause cracking of foil 2 at groove locations 8 where the stress concentration is high. This foil fragmentation step is carried out at a temperature suited for cracking the foil, generally at room temperature.

The next step, shown in FIG. 2B, is an extrusion step. After foil fragmentation, the pack temperature is raised to the forming temperature of sheets 4, 6 while providing a suitable forming pressure 12 on the pack. The material of sheets 4, 6 is extruded into the grooves and through the cracks in foil 2 causing the oxide to rupture and expose unoxidized metal. Because the cracks represent passages with a large height-to-width ratio, the surface deformation in this highly localized area is between 100% to 200%. This amount of surface deformation exposes a sufficient area of unoxidized metal to provide a sound diffusion bond when material from both sheets comes into contact.

The final step, shown in FIG. 2C, is the diffusion bonding of the two sheets after the material has extruded through the cracks and then been held by pressure 14 in contact at temperature for a sufficient time for solid state diffusion to create the bond. Foil fragments 16 are left within the bond region and by virtue of their higher strength they can form a composite having strength which is actually higher than the strength of the matrix alloy. This complete process can be accomplished with no more than 2% to 3% overall compression (thinning) of pack 2, 4, 6.

The process does not require a high vacuum environment such as the $10^{-8}$ torr vacuum required to prevent formation of an oxide on aluminum. The process can be done in air, in a low pressure inert atmosphere such as argon, or in vacuum. As shown in FIGS. 2A and 2B, the fragmentation step and the extrusion step are accomplished while the sheets are under pressure and the surfaces being extruded and bonded are pressed tightly against interlayer foil 2. Consequently, these surfaces are not exposed to the outside environment. When oxide-free surfaces are created during the extrusion step (FIG. 2B), there is very little or no oxygen available to form a new oxide in the bond location.

If the material being bonded has superplastic properties, then the bonded assembly can be superplastically formed subsequently. In the example shown in FIG. 1, a small tube 18 is bonded into the pack so that gas pressure can be used to superplastically expand sheet 4, 6 and form a pillow structure. This can be accomplished at the bonding temperature without removing the stack from the bonding fixture. More complicated structures having multiple layers of diffusion bonded superplastic aluminum can be formed using techniques developed for titanium alloys such as described in U.S. Pat. No. 3,927,817.

As used in this application, the term "metal" or "alloy" also encompasses composites which use the metal or alloy as the matrix for the composite. Examples of such composites are: silicon carbide within a matrix of 7475 aluminum alloy (7475 Al/SiC); graphite within a matrix of 6061 aluminum alloy (6061 Al/graphite); and graphite in a matrix of magnesium (Mg/graphite).

Examples of the method of the invention which can be used to form aluminum and magnesium alloys are presented below.

EXAMPLE I

A 3"×3", two-sheet pack was made from 7475 superplastic aluminum alloy as shown in FIG. 1. These sheets are solution treated at 500° C. for ½ hour and water quenched to obtain them in the soft condition. The inner layer was a thin titanium foil with 50 grooves per inch scribed on its surface. Before assembly, the parts were degreased and the 7475 aluminum alloy was wire brushed. The central portions of the sheets were coated with boron nitride stop-off to prevent any bonding of the aluminum sheets in this area. The pack was enclosed in a stainless steel bag and evacuated to a vacuum of $10^{-5}$ torr.

The bag was inserted in a press containing ceramic platen heaters and loaded to a compressive stress of 30,000 psi at room temperature. This first step was done to fracture the titanium interlayer. The heaters were then turned on to heat the aluminum alloy to its superplastic forming temperature of 516° C. The platen pressure was reduced to 3,000 psi, and stops were provided to prevent more than 5% compression of the overall sheet thickness as the temperature was increased to over 400° C.

After bonding at 516° C. for about 30 minutes, gas pressure expansion of the pack was carried out at 516° C. Gas pressure was supplied to the center of the pack through a capillary tube in order to form the material at a strain rate ($\epsilon$) of $2\times 10^{-4}s^{-1}$. During this superplastic expansion of the material to form a pillow structure, the bonded regions had to support the pressure of expansion. This provided a good test of the high temperature strength of the diffusion bond.

FIG. 3 shows a cross-section of the two-sheet pillow produced. Line 20 shows the location of the solid state diffusion joint. A photomicrograph of the bond taken at location 22 is shown in FIG. 4. There is no melting and no evidence of either oxide or voids at the interface of the titanium foil fragment 22 and the 7475 aluminum alloys sheets 4 and 6.

EXAMPLE II

The properties of silver and nickel (and some of their alloys) should make them acceptable for use as an interlayer foil. These materials should first be cold rolled sufficiently to lower their ductility and increase their hardness so that the foil will fragment and deform the aluminum sheets during the fragmentation and extrusion steps. If a two-sheet pack is fabricated using these materials and then processed as described in Example I, a good solid state bond should be obtained.

EXAMPLE III

A solid state bond could be made between sheets of commercially pure aluminum (1100 alloy) using the processes described in Examples I-II. A higher bonding temperature (up to 580° C.) could be used because of the higher melting temperature of pure aluminum. The bonded material could not be superplastically formed because the material itself is not superplastic.

EXAMPLE IV

A solid state bond could be made between sheets of an aluminum-lithium alloy (for example 1.83% Cu, 2.95% Li, 0.5% Mg, 0.19% Zr, and balance Al) using the process described in Examples I-II. If the aluminum lithium sheets are properly treated to make the material superplastic, then the bonded sheets can also be superplastically formed. For the exemplary Al-Li alloy, a bonding and superplastic forming temperature of about 510° C. would be recommended.

EXAMPLE V

Magnesium alloys have a tightly adherent oxide film similar to the oxide film on aluminum alloys. Consequently, magnesium alloys can be solid state diffusion bonded according to the procedure described in Examples I-II. For a ZK-60 Mg alloy, bonding temperatures within 360°-400° C. could be used. A specially grain refined ZK-60 alloy which exhibits superplasticity may be superplastically formed after the bonding step to produce monolithic trusscore structures.

EXAMPLE VI

Sheets or components made of composite materials which have an aluminum alloy matrix could be bonded together using the process described in Examples I-II. In the case of a 7475 Al/SiC composite, the bonding temperature of 7475 alloy (about 516° C.) would be satisfactory. In the case of a 6061 Al/graphite composite, a bonding temperature of about 560° C. would be satisfactory.

EXAMPLE VII

Although the above examples show components of the same alloys being bonded together, components of different alloys could also be bonded together. An Al alloy/SiC composite could be bonded to a 7475 aluminum alloy at a bonding temperature of about 516° C.; or even to a magnesium base alloy such as alloy ZK-60 at a bonding temperature in the range of about 380° C. to 400° C.

EXAMPLE VIII

Mg alloy/graphite composites could be bonded together or bonded to other aluminum or magnesium alloys using the process described in the above examples. For Mg alloy/graphite composite, the bonding temperature should be in the range of about 380° C. to 400° C.

As the above examples illustrate, numerous variations can be made without departing from the invention. For example, other materials such as steel, stainless steel, silicon, zirconium etc., can be evaluated empirically and used for interlayer foils if suitable bonds are obtained. Similarly, the particular pressures, temperatures, and atmospheres used can be determined by actual tests to arrive at optimum conditions for particular applications. Accordingly, it should be understood that the form of the invention described above is illustrative and is not intended to limit the scope of the invention.

What is claimed is:

1. A method of solid state joining comprising the steps of:
    providing a first part to be joined, said first part being made from a metal selected from the group consisting of aluminum, aluminum alloy, magnesium, and magnesium alloy;
    providing a second part to be joined, said second part being made from a metal selected from said group;
    providing a foil of a material which is harder than said first and second parts, and which has a melting temperature above the temperature used during joining, and which will crack when compressed between said first and second parts;
    placing said foil between said first and said second parts in the location to be joined;
    applying pressure to said first and second parts to crack said foil; and
    applying heat and pressure to said foil and to said first and second parts in the location to be joined for a sufficient time, temperature, and pressure to cause flow of said metal into said cracks and through said foil, whereby metal from said first and second parts are brought into contact with each other to form a solid state joint having fragments of said cracked foil along said joint.

2. The method as claimed in claim 1 wherein said foil has a network of grooves on its surface to facilitate cracking during said step of applying pressure.

3. The method as claimed in claim 1 wherein said material of said foil comprises a metal selected from the group consisting of silver, silver alloy, titanium, titanium alloy, nickel, nickel alloy, iron, iron alloy, silicon, and silicon alloy.

4. The method as claimed in claim 1 wherein said step of applying heat and pressure is accomplished in an air atmosphere.

5. The method as claimed in claim 1 wherein said step of applying heat and pressure is accomplished in a vacuum atmosphere.

6. The method as claimed in claim 1 wherein said step of applying heat and pressure is accomplished in an inert atmosphere.

7. The method as claimed in claim 1 wherein said metal of said first and second parts is a superplastic aluminum alloy, and wherein said temperature used during said step of applying heat and pressure is a temperature at which said aluminum alloy exhibits superplastic properties.

8. The method as claimed in claim 7 including the step of superplastically forming said aluminum alloy after said step of applying heat and pressure.

9. The method as claimed in claim 1 wherein said metal of said first and second parts is a superplastic magnesium alloy, and including the step of superplastically forming said magnesium alloy after said step of applying heat and pressure.

10. The method as claimed in claim 1 including the step of applying a stop-off material between portions of said first and second parts which are not to be joined, said stop off being applied before said step of applying pressure.

11. The method as claimed in claim 1, including the step of cleaning said parts in the joint area prior to said step of placing said foil.

12. A method of solid state joining superplastic aluminum alloy comprising the steps of:
providing two parts of a superplastic aluminum alloy;
providing a friable foil of material selected from the group consisting of silver, silver alloy, titanium, titanium alloy, nickel, nickel alloy, iron, iron alloy, silicon, and silicon alloy;
placing said foil between said two parts in the location to be joined;
applying pressure to said two parts to crack said foil;
providing a non-oxidizing environment adjacent the location to be joined;
heating said foil and said two parts to a temperature at which said aluminum alloy becomes superplastic; and
applying pressure to said two parts in the location to be joined, whereby said aluminum alloy flows into said cracks and through said foil to form a solid state joint having fragments of said cracked foil along said joint.

13. The method as claimed in claim 12, wherein said non-oxidizing atmosphere comprises a vacuum atmosphere.

14. The method as claimed in claim 12, wherein said step of providing a non-oxidizing environment begins after said step of placing said foil and continues through said step of applying pressure.

15. The method as claimed in claim 12 wherein said non-oxidizing environment comprises an inert gas.

16. The method as claimed in claim 12 including the step of superplastically forming said aluminum alloy after said step of applying heat and pressure.

17. The method as claimed in claim 12 including the step of applying a stop-off material between portions of said two parts which are not to be joined, said stop off being applied before said step of applying pressure.

18. A method of solid state joining superplastic aluminum alloy comprising the steps of:
providing two parts of a superplastic aluminum alloy;
providing a friable foil of titanium having a network of grooves on its surface to facilitate cracking;
placing said oil between said two parts in the location to be joined;
applying pressure to said two parts to crack said foil;
providing a vacuum atmosphere environment adjacent the location to be joined;
heating said foil and said two parts to a temperature at which said aluminum alloy becomes superplastic; and
applying pressure to said two parts in the location to be joined, whereby said aluminum alloy flows into said cracks and through said foil to form a solid state joint having segments of said cracked foil along said joint.

19. A solid state joint produced by the method of:
providing a first part to be joined, said first part being made from a metal selected from the group consisting aluminum, aluminum alloy, magnesium, and magnesium alloy;
providing a second part to be joined, said second part being made from a metal selected from said group;
providing a foil of a material which is harder than said first and second parts, and which has a melting temperature above the temperature used during joining, and which will crack when compressed between said first and second parts;
placing said foil between said first and said second parts in the location to be joined;
applying pressure to said first and second parts to crack said foil; and
applying heat and pressure to said foil and to said first and second parts in the location to be joined for a sufficient time, temperature, and pressure to cause flow of said metal into said cracks and through said foil, whereby metal from said first and second parts are brought into contact with each other to form a solid state joint having fragments of said cracked foil along said joint.

20. A joint between two aluminum alloy parts comprising:
a first aluminum alloy part;
a second aluminum alloy part diffusion bonded to said first aluminum alloy part;
unmelted pieces of a fragmented foil dispersed between said first and second aluminum alloy part along the diffusion bond, said foil comprising a material which is harder than said first and second aluminum alloy.

21. A joint between two magnesium alloy parts comprising:
a first magnesium alloy part;
a second magnesium alloy part diffusion bonded to said first magnesium part;
unmelted pieces of a fragmented foil dispersed between said first and second magnesium alloy parts along the diffusion bond, said foil comprising a material which is harder than said first and second magnesium alloy.

* * * * *